United States Patent [19]

Yamaguchi et al.

[11] Patent Number: 5,323,244
[45] Date of Patent: Jun. 21, 1994

[54] RECORDING AND REPRODUCING APPARATUS

[75] Inventors: Susumu Yamaguchi, Nishinomiya; Chiyoko Matsumi, Osaka, both of Japan

[73] Assignee: Matsushita Electric Industrial Co., Ltd., Osaka, Japan

[21] Appl. No.: 124,748

[22] Filed: Sep. 22, 1993

[30] Foreign Application Priority Data

Sep. 24, 1992 [JP] Japan .................................. 4-254317

[51] Int. Cl.$^5$ .............................................. H04N 7/16
[52] U.S. Cl. .................................... 358/335; 358/341; 380/5
[58] Field of Search ....................... 358/335, 342, 310; 360/60; 380/3, 4, 5, 7, 9, 19, 20

[56] References Cited

U.S. PATENT DOCUMENTS

| 4,484,027 | 11/1984 | Lee et al. | 178/22.13 |
| 5,058,159 | 10/1991 | Quan | 380/19 |
| 5,073,925 | 12/1991 | Nagata et al. | 380/3 |

FOREIGN PATENT DOCUMENTS 486177  3/1992  Japan .

Primary Examiner—Tommy P. Chin
Assistant Examiner—Robert Chevalier
Attorney, Agent, or Firm—Lowe, Price, LeBlanc & Becker

[57] ABSTRACT

A recording and reproducing apparatus suitable for keeping the secrecy of video and audio signals recorded in, for example, a video tape recorder for private use to a high degree. A recording portion of the recording and reproducing apparatus is provided with an identification code input device, an operation designating device and an operation circuit. Further, a reproducing portion of the recording and reproducing apparatus is provided with an operation identification device and a comparator. When recording video and audio signals, a scramble pattern for scrambling the video and audio signals is generated from an input identification code to scramble the video and audio signals. Further, a predetermined operation is performed on the input identification code to produce a first ID signal representing a result of the operation. Then, the scrambled video and audio signals, the first ID signal and an operation identification signal indicating data designating the operation are recorded. When reproducing the video and audio signals, the predetermined operation designated by the operation identification signal is performed on an identification code input from the exterior of the apparatus. Then, a second ID signal representing a result of this operation is compared with the first ID signal reproduced by the reproducing portion. Subsequently, a descrambling is performed on the scrambled video and audio signals according to a result of the comparison.

19 Claims, 6 Drawing Sheets

IDC : IDENTIFICATION CODE

FIG. 4

| No | OPERATION IDENTIFICATION CODE | POWER EXPONENT | IDENTIFICATION CODE LENGTH | DIVISOR POLYNOMIAL |
|---|---|---|---|---|
| 0 | 0 0 0 0 | $n_0$ | $m_0$ | $N_0$ |
| 1 | 0 0 0 1 | $n_1$ | $m_1$ | $N_1$ |
| 2 | 0 0 1 0 | $n_2$ | $m_2$ | $N_2$ |
| 3 | 0 0 1 1 | $n_3$ | $m_3$ | $N_3$ |
| 4 | 0 1 0 0 | $n_4$ | $m_4$ | $N_4$ |
| ... | ... | ... | ... | ... |
| 14 | 1 1 1 0 | $n_{14}$ | $m_{14}$ | $N_{14}$ |
| 15 | 1 1 1 1 | $n_{15}$ | $m_{15}$ | $N_{15}$ |

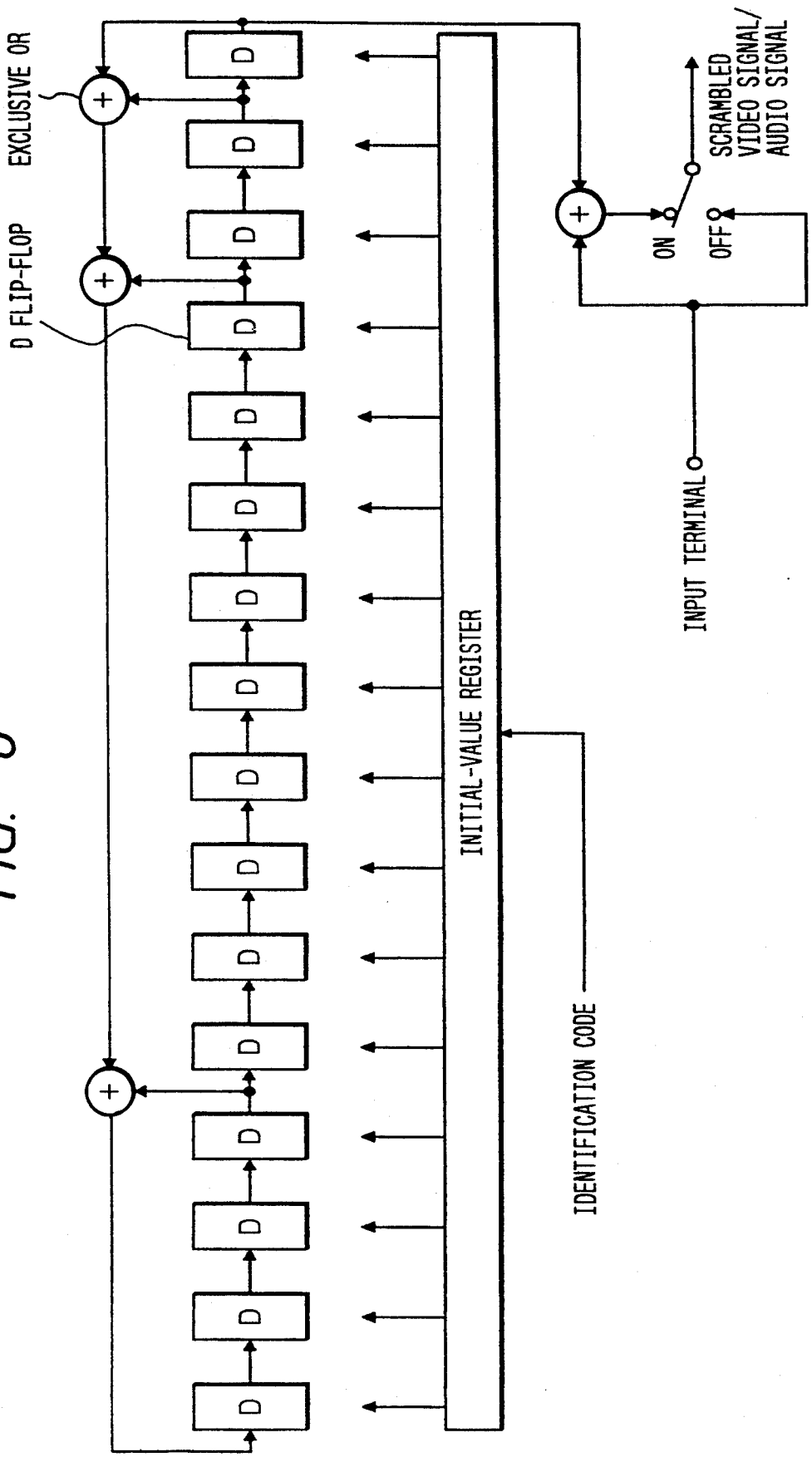

RECORDING AND REPRODUCING APPARATUS

BACKGROUND OF THE INVENTION

1. Field of The Invention

This invention relates to a recording and reproducing apparatus which has a scrambling function for keeping the contents of a record secret and reproduces the record under restricted reproduction condition.

2. Description of The Related Art

In recent years, there has been achieved notable progress of an apparatus for recording and reproducing a video signal and an audio signal (for example, a video tape recorder). Especially, the development of a recording system from an analogue recording system to a digital recording system has brought an improved high-image-quality and high-sound-quality apparatus into being.

Such an improved apparatus, however, has encountered a problem of protecting the copyrighted contents of a record from illegal copying thereof from media on which the record is recorded.

To resolve such a problem, in the field of digital audio technology, a serial copy management system (SCMS) is introduced for protecting copyrights.

Meanwhile, the improved apparatus has also encountered another problem of keeping the contents of a record secret in case where at the time of recording information (namely, the contents of a record to be recorded), a signal representing the information is scrambled and thereafter, at the time of reproducing the information, a descrambling is performed only when restricted reproduction condition is met.

A conventional recording and reproducing apparatus developed to resolve this problem is disclosed in, for instance, the Japanese Unexamined Patent Publication (Kokai Tokkyo Koho) Official Gazette H4-86177.

Hereinafter, this conventional recording and reproducing apparatus will be outlined.

First, a recording portion of this conventional recording and reproducing apparatus comprises a scrambling circuit for scrambling a video signal and an identification (ID) code generating circuit for generating a proper ID code. Further, a scrambled video signal, as well as an ID code, is sent to a head. Then, the video signal and the ID code are recorded on a recording medium such as magnetic tape. The ID code is recorded in, for example, a vertical-interval time code (VITC) data area.

Moreover, a reproducing portion of this conventional recording and reproducing apparatus comprises a descrambling circuit for descrambling a reproduction video signal and an ID detection circuit for determining whether or not a reproduced ID code matches the proper ID code. Furthermore, only when this ID detection circuit determines that the reproduced ID code matches the proper ID code, the reproducing portion reproduces the video signal by descrambling the reproduction video signal.

Thus, among the conventional apparatuses of a same type, ID codes corresponding to the same information represented by a video signal are made to differ with these apparatuses in case where full compatibility is inconvenient for keeping the information secret. Namely, the compatibility of this conventional apparatus with the conventional apparatus of the same type is limited.

However, in case of this conventional recording and reproducing apparatus, an ID code per se is recorded on the tape (for example, in the VITC data area). Therefore, the ID code can be easily decoded from a reproduction signal. Consequently, this conventional recording and reproducing apparatus has a drawback in that the secrecy of the contents of a record represented by a video signal can be easily violated by specifying an apparatus being capable of reproducing the video signal and by further changing a value set in each apparatus.

Further, this conventional recording and reproducing apparatus has another drawback. Namely, there is no causal relation between the ID code and the scrambling. Thus, if a third person makes his private descrambling apparatus, any video signal recorded by this conventional apparatus can be reproduced by such a descrambling apparatus. Consequently, there is a fear that the scrambling of the video signal may come to mean nothing.

The present invention is accomplished to eliminate the drawbacks of the conventional recording and reproducing apparatus.

SUMMARY OF THE INVENTION

It is, accordingly, an object of the present invention to provide a recording and reproducing apparatus which can conceal the contents of a record strictly from any unlicensed or unauthorized person by scrambling a video signal and/or an audio signal in such a manner that the scrambled signals can not be easily descrambled if an ID code is read or known by unlicensed person.

To achieve the foregoing object, in accordance with an aspect of the present invention, there is provided a recording and reproducing apparatus which comprises a recording portion and a reproducing portion. Further, the recording portion comprises first identification code input means for inputting an identification code, a scrambling circuit for generating a scrambling pattern according to the input identification code and for scrambling a video signal and/or an audio signal by using a signal representing the generated scrambling pattern, a first operation circuit for performing a predetermined operation on the input identification code and for outputting a first ID signal representing a result of the operation, operation method designating means (hereunder sometimes referred to simply as operation designating means or device) for outputting an operation method identification signal (hereunder sometimes referred to simply as an operation identification signal) designating the predetermined operation to the operation circuit, a multiplexing circuit for performing a multiplexing on the scrambled video signal and/or the scrambled audio signal and the first ID signal and the operation identification signal and for outputting a signal obtained as a result of the multiplexing and recording means for recording the signal output from the multiplexing circuit on a recording medium.

Moreover, the reproducing portion comprises reproduction means for reproducing the signal recorded on the recording medium, a demultiplexing circuit for separating a signal reproduced by the reproduction means into a reproduced video signal and/or a reproduced audio signal which were scrambled and recorded on the recording medium (hereunder sometimes referred to as reproduction scrambled video signal and/or audio signal), a reproduced first ID signal and a reproduced operation identification signal, second identification code input means for inputting an identification code, a second operation circuit for performing a predetermined operation designated by the reproduced operation identification signal on the identification code input by the second identification code input means and for outputting a second ID signal representing a result of the operation, a comparator for comparing a value represented by the second ID signal with a value represented by the reproduced first ID signal and for outputting a signal representing a result of the comparison and a descrambling circuit for performing a descrambling of the reproduction scrambled video signal and/or audio signal according to the signal output by the comparator.

Thus, the recording and reproducing apparatus of the present invention first inputs an identification code when recording video and audio signals. Then, a scrambling pattern such as a pseudorandom noise (PN) code is generated by using the input identification code as an initial value for generating the scrambling pattern. Further, a scrambling is performed on a video signal and/or an audio signal by using the generated scrambling pattern. Moreover, a predetermined operation designated by an operation identification signal output from the operation designating means is performed on the input identification code and as a result, a first ID signal is obtained. Then, a multiplexing is performed on the scrambled video signal and/or the scrambled audio signal, the first ID signal and the operation identification signal. Subsequently, a signal produced as the result of the multiplexing is recorded on the recording medium. Next, when reproducing the recorded signal, the reproduced signal is separated into the reproduction scrambled video signal and/or audio signal, the reproduced first ID signal and the reproduced operation identification signal. Simultaneously with this, the predetermined operation designated by the operation identification signal is performed on an identification code input from the exterior of the apparatus. Then, a second ID signal representing a result of this operation is compared with the first ID signal obtained as the separation from the signal reproduced by the reproduction means. Subsequently, a descrambling is performed on the scrambled video signal and/or the scrambled audio signal. Thereby, the video signal and/or the audio signal can be reproduced by highly keeping the secrecy of information or data represented by the signals.

Further, as described above, in case of the recording and reproducing apparatus of the present invention, the identification code is not directly recorded on the recording medium. Namely, instead of recording the identification on the recording medium, the first ID signal obtained as the result of the operation performed on the identification code and the operation identification signal are recorded on the recording medium. Thereby, it becomes very difficult to decode the identification code from the ID signal. Moreover, in case of the recording and reproducing apparatus of the present invention, a plurality of operations to be performed in the operation circuits are predetermined or preset. Thus, information represented by the operation identification signal can be utilized as a second key for scrambling.

Additionally, as countermeasures to counter various attempts made by unauthorized persons to decipher the protected contents of a record written to the recording medium through trial and error or by using a computer or the like, when an erroneous identification code is input to the recording and reproducing apparatus, a normal reproducing operation is interrupted by, for example, ejecting a cassette including the recording medium from the apparatus, or turning off the power source of the apparatus. Thereby, it becomes very difficult to decipher the protected contents of the record in a short time.

BRIEF DESCRIPTION OF THE DRAWINGS

Other features, objects and advantages of the present invention will become apparent from the following description of a preferred embodiment with reference to the drawings in which like reference characters designated like or corresponding parts throughout several views, and in which:

FIG. 4 is a diagram for illustrating the corresponding relation among 4-bit operation identification code, which is represented by the operation designation signal, and values of parameters m and n and polynomials N (to be described later);

FIG. 6 is a schematic block diagram for illustrating the configuration of an example of a scrambling circuit of the embodiment of FIG. 1.

DETAILED DESCRIPTION OF THE PREFERRED EMBODIMENT

Hereinafter, a preferred embodiment of the present invention will be described in detail by referring to the accompanying drawings.

Figure 1:
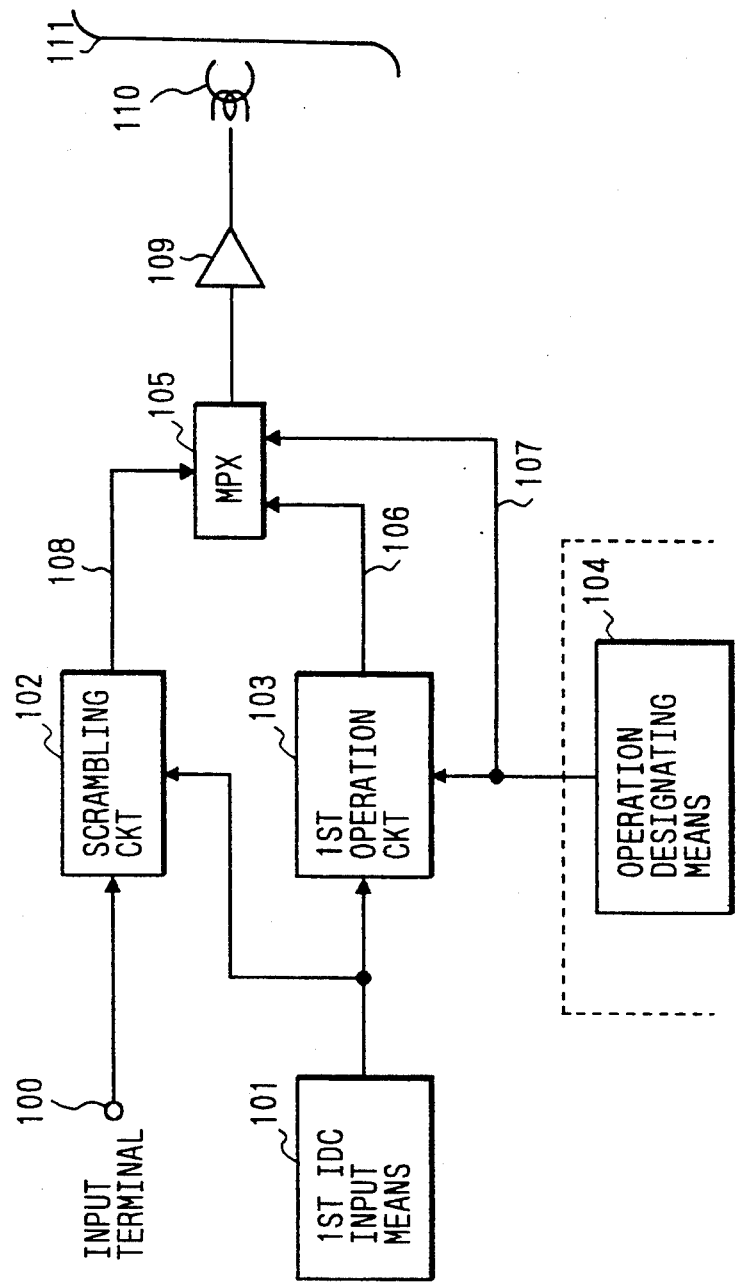
FIG. 1 is a schematic block diagram for illustrating the configuration of a recording portion of a recording and reproducing apparatus embodying the present invention.

FIG. 1 is a schematic block diagram for illustrating the configuration of a recording portion of the embodiment of the present invention (namely, a recording and reproducing apparatus embodying the present invention). In this figure, reference numeral 100 represents an input terminal for inputting normal video and audio signals; 101 a first identification code input means; 102 a scrambling circuit; 103 a first operation circuit; 104 an operation designating means; 105 a multiplexing circuit; 106 a first ID signal representing a result of an operation performed in the operation circuit 103; 107 an operation identification signal; 108 scrambled video signal and/or scrambled audio signal; 109 a recording circuit; 110 a magnetic head; and 111 a recording medium such as magnetic tape.

Figure 2:
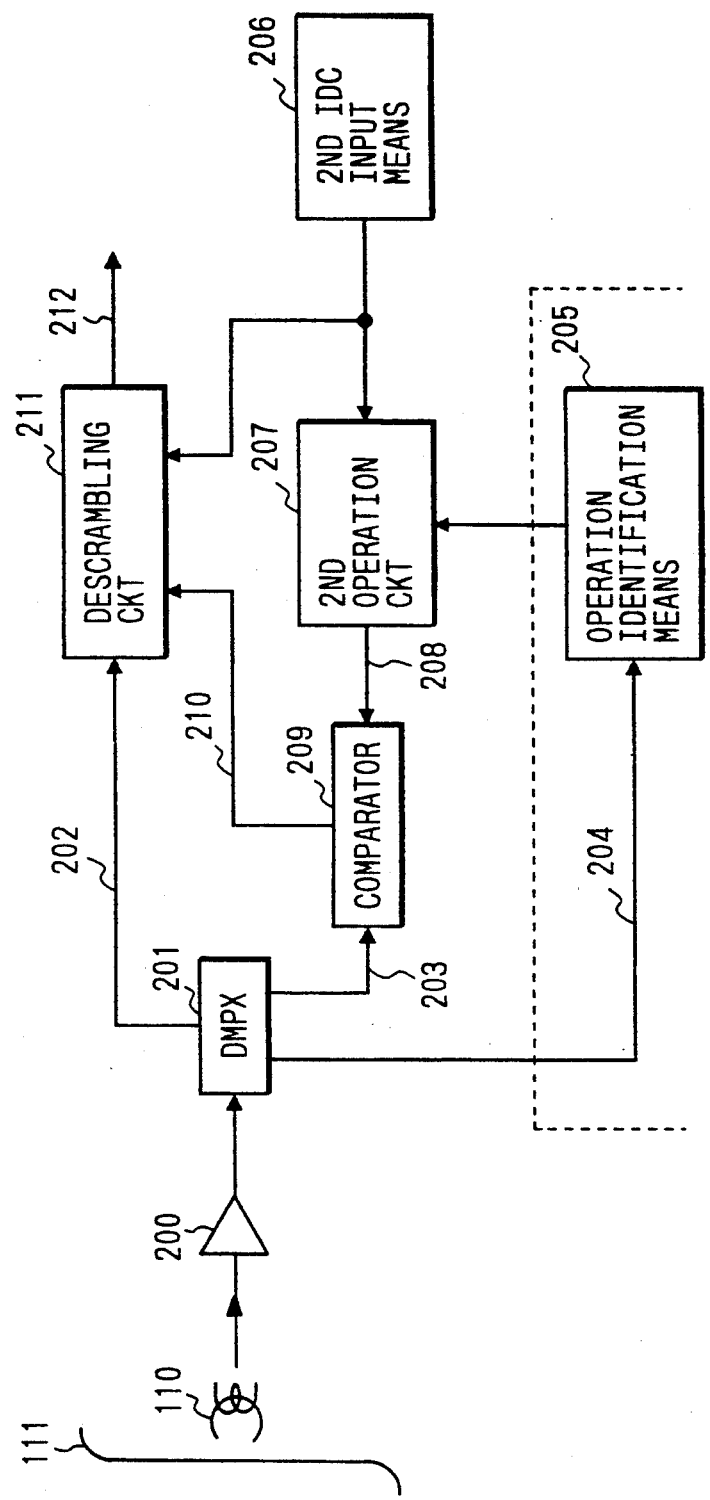
FIG. 2 is a schematic block diagram for illustrating the configuration of a reproducing portion of the recording and reproducing apparatus embodying the present invention (namely, the embodiment of FIG. 1)

Further, FIG. 2 is a schematic block diagram for illustrating the configuration of a reproducing portion of the recording and reproducing apparatus embodying the present invention (namely, the embodiment of FIG. 1). In this figure, reference numeral 200 denotes a reproduction circuit for reproducing signals sent from the magnetic head 110; 201 a demultiplexing circuit; 202 reproduced video signal and/or audio signal, which signals have been scrambled in the recording portion; 203 a reproduced first ID signal; 204 a reproduced operation identification signal; 205 an operation method identification means (hereunder sometimes referred to simply as an operation identification means); 206 a second identification code input means; 207 a second operation circuit; 208 a second ID signal representing a result of an operation performed in the second operation circuit 207; 209 a comparator; 210 a coincidence signal indicating that the second ID signal obtained as the result of the operation performed by the second operation circuit 207; 211 a descrambling circuit; and 212 an output terminal for outputting reproduced and descrambled video signal and/or audio signal (namely, normal signals) when a predetermined condition is satisfied, and for outputting the scrambled video signal and/or audio signal when the predetermined condition is not met.

Hereunder, an operation of the embodiment constructed as above-mentioned will be described in detail.

First, in the recording portion, an identification code input from the first identification code input means 101 to the scrambling circuit 102. Then, the scrambling circuit 102 generates a scrambling pattern such as a PN code by using the input identification code as an initial value for generating the scrambling pattern. Further, the scrambling circuit 102 performs a scrambling on normal video signal and/or audio signal which signals are input from the input terminal 100. Thereafter, the scrambling circuit 102 outputs the scrambled video signal and/or audio signal to the multiplexing circuit 105. On the other hand, the first operation circuit 103 performs an operation designated by the operation designating means 104 on the input identification code M and outputs the first ID signal 106 representing a result of effecting the operation to the multiplexing circuit 105 together with the operation identification signal 107. Then, the multiplexing circuit 105 performs a time-division multiplexing on the first ID signal 106, the operation identification signal 107 and the scrambled video signal and/or scrambled audio signal 108, which signals are input thereto, and thus produces a recording signal. Subsequently, the recording signal is recorded on the magnetic tape 111 through the recording circuit 109 and the magnetic head 110.

Thereafter, in the reproducing portion, the signal recorded on the magnetic tape 111 is reproduced through the magnetic head 110 and the reproducing circuit 200. Then, the reproduced signal is input to the demultiplexing circuit 201. Subsequently, the demultiplexing circuit 201 separates the reproduced signal into the reproduction scrambled video signal and/or the scrambled audio signal 202, the reproduced first ID signal 203 and the reproduced operation identification signal 204. Further, the reproduction scrambled video signal and/or the scrambled audio signal 202 are input to the descrambling circuit 211. On the other hand, the reproduced operation identification signal 204 is input to the operation identification means 205 whereupon the designated operation is identified from the input signal 204. Then, the operation identification means 205 outputs to the second operation circuit 207 a signal indicating the designated operation. In the second operation circuit 207, the operation designated by the output signal of the operation identification means 205 is performed on the identification code M. Upon completion of performing the operation, the second operation circuit 207 outputs to the comparator 209 the second ID signal 208 representing a result of performing the operation. Subsequently, in the comparator 209, the ID signal 208 is compared with the reproduced ID signal 203. If the signal 208 matches the signal 203, the coincidence signal 210 is output to the descrambling circuit 211 from the comparator 209. The descrambling circuit 211 receives the coincidence signal 210 output by the comparator 209 and an identification code sent from the second identification code input means 206. As the result, when a predetermined condition is met, the descrambling circuit 211 generates a descrambling pattern to descramble the reproduction scrambled video signal and/or audio signal. Then, the descrambling circuit 211 outputs normal video signal and/or normal audio signal through the output terminal 212.

Next, it will be described hereinbelow how operations are performed in the first operation circuit 103 of FIG. 1 and the second operation circuit 207.

If the input identification code per se is recorded on the recording medium, the operations and the comparison between the ID signals can be very easily performed. However, there is a strong possibility that the identification code is read from the recorded signal. But, in case where the identification code is not recorded thereon, if the input identification code is forgotten, it is almost impossible to reproduce the identification code from the recorded signal.

Therefore, the input identification code per se should not be recorded thereon and some processing should be performed on the input identification code. It is preferable that as the result of performing such a processing, the identification code becomes hard for unauthorized persons to know or presume from the recorded signal, namely, the ID signal in case of this embodiment and that the conversion of the signal representing the input identification code into the ID signal can be easily effected by performing such a processing. In case of this embodiment, the following operation is performed in the first operation circuit of FIG. 1 and the second operation circuit 207 of FIG. 2.

First, a function of an m-byte input identification code M is obtained. Namely, in case of this embodiment, the input identification M is raised to the nth power. Then, the function or product (namely, $M^n$) is divided by a predetermined polynomial N. Namely, $$M^n/N = Q \ldots R$$

where Q denotes a quotient; and R a remainder. Subsequently, the remainder R is recorded as a value to be indicated by the ID signal. Simultaneously, data representing the length m in bytes of the identification code M, the power exponent n and the kind of the polynomial N is recorded as an operation identification code which is 4 bits in length in case of this embodiment.

Hereinafter, it will be described by referring to FIGS. 3 and 4 how the result of the operation indicated by the ID signal and the operation identification code are recorded on the recording medium.

Figure 3:
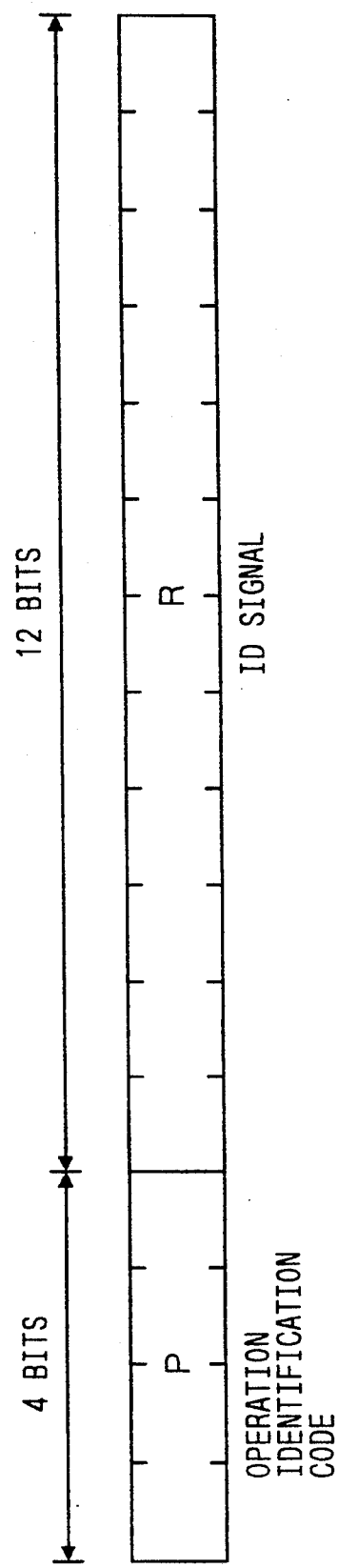
FIG. 3 is a diagram for illustrating 16-bit data represented by an operation identification signal and an ID signal of the embodiment of the present invention as shown in FIGS. 1 and 2.

As illustrated in FIG. 3, data representing the operation identification code and the result of the operation indicated by the ID signal is 16 bits in length. Further, 4 bits and 12 bits are allocated to the former (namely, the operation identification code) and the latter (namely, the result of the operation), respectively. Apparently, the number of bits may be suitably changed.

Further, FIG. 4 is a diagram for illustrating the corresponding relation among the 4-bit operation identification code of FIG. 3 and the length in bytes of the operation identification code m and the power exponent n (incidentally, m is a positive integer and n is a integer equal to or greater than 0) and the polynomial N.

For instance, as shown in FIG. 4, in case that $n_0=2$ and $m_0=4$, $N_0=x^{12}+x^6+x^4+x+1$. Practically, the values of m and n and the kind of the polynomial N are determined according to the secrecy and application of the contents of a record.

Incidentally, in case of this embodiment, n is the power exponent. However, the function of the identification code M is not necessarily limited to the nth power of the identification code M. Any other function of the identification code M (for example, the identification code M multiplied by a constant) may be employed instead of the nth power of the identification code M.

Figure 5:
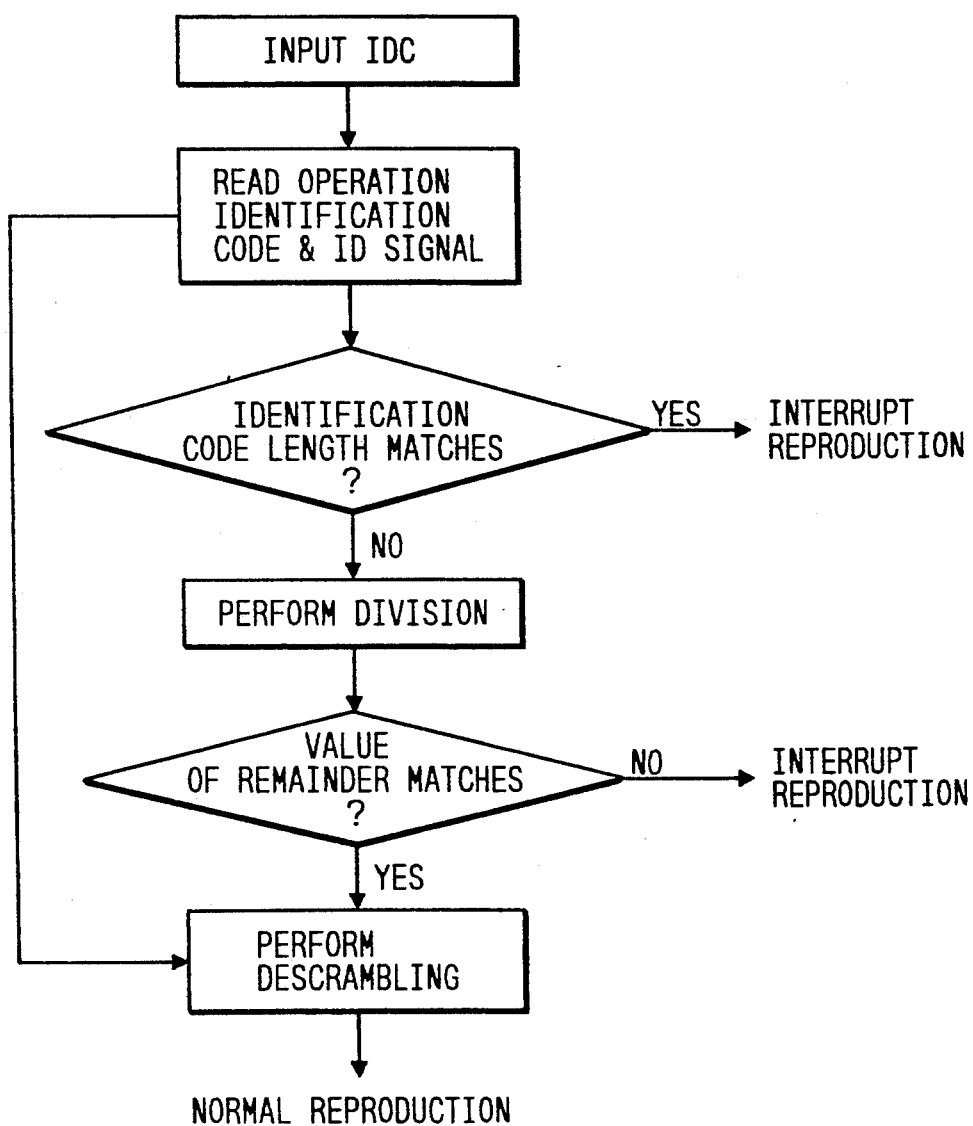
FIG. 5 is a flowchart for illustrating an algorithm employed for comparing an ID signal representing a result of an operation performed in the reproducing portion with an ID signal obtained from a signal reproduced from a recording medium.

Further, FIG. 5 is a flowchart for illustrating an algorithm employed for comparing the ID signal representing a result of the operation performed in the reproducing portion with the ID signal obtained from a signal reproduced from the recording medium.

Moreover, FIG. 6 is a schematic block diagram for illustrating the configuration of the scrambling circuit 102 of the embodiment of FIG. 1. In case of the scrambling circuit 102 of FIG. 6, the following polynomial is employed for generating a PN code.

$$f(x)=x^{16}+x^{12}+x^3+x+1$$

Apparently, other polynomials of different degrees may be employed so long as such polynomials are primitive polynomials.

Furthermore, in case of the circuit of FIG. 6, an addition of a PN code using the identification code as a seed is employed as a scrambling method. However, other scrambling methods may be employed. Preferably, a scrambling method which is most suitable for video and audio signals is employed.

Incidentally, in case of this embodiment, a value indicated by the operation identification signal output from the operation designating means 104 of FIG. 1 is recorded on and reproduced from the magnetic tape and is used for the comparison made by the comparator 209. Instead of this, the value indicated by the operation identification signal (or a fixed value) may be stored in a storage portion of each recording and reproducing apparatus (in such a case, it is not necessary to record the value indicated by the operation identification signal on the magnetic tape).

Further, the value indicated by the operation identification signal may be utilized as means for improving the ability of keeping the secrecy of the contents of a record.

Moreover, the hardware of the operation designating means 104 may be separated from the apparatus. Furthermore, data concerning the predetermined operations to be performed by the operation circuits may be stored in an integrated circuit (IC) card and used as the second key following the identification code (namely, a first key).

Furthermore, in case of using what is called a Memory in Cassette (MIC (namely, a nonvolatile memory provided or contained in a cassette)), values indicated by an ID signal and/or an operation identification signal may be written to both of the magnetic tape and the nonvolatile memory, simultaneously. Apparently, such values may be written only to the nonvolatile memory.

Additionally, in case of this embodiment, the first identification code input means 101 and the second identification code input means 206 are separated from and are independent of each other. However, a single identification code input means may be employed and utilized in common for inputting identification codes to be used in the recording and reproducing portions.

Further, the recording and reproducing apparatus of the present invention can employ the above described counterplots against attempts made by unauthorized persons, who do not know the identification code, to decipher the protected contents of a record written to the recording medium through trial and error or by using a computer or the like. Namely, when an erroneous identification code is input to the recording and reproducing apparatus of the present invention, a normal reproducing operation is interrupted by, for example, ejecting a cassette including the recording medium from the apparatus, or turning off the power source of the apparatus. Thereby, it becomes very difficult for the unauthorized persons to decipher the protected contents of the record in a short time.

In addition, in case of the above described embodiment, the present invention is applied to a recording and reproducing apparatus. Apparently, the present invention can be applied to a recording apparatus (namely, an apparatus dedicated to recording signals) or a reproducing apparatus (namely, an apparatus dedicated to reproducing signals).

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A recording and reproducing apparatus having a recording portion and a reproducing portion, the recording portion comprising:

first identification code input means for inputting an identification code;

a scrambling circuit for generating a scrambling pattern according to the input identification code and for scrambling a video signal and/or an audio signal by using a signal representing the generated scrambling pattern;

a first operation circuit for performing a predetermined operation on the input identification code and for outputting a first ID signal representing a result of the operation;

operation designating means for outputting an operation identification signal designating the predetermined operation to the first operation circuit;

a multiplexing circuit for performing a multiplexing on the scrambled video signal and/or the scrambled audio signal and the first ID signal and the operation identification signal and for outputting a signal obtained as a result of the multiplexing; and recording means for recording the signal output from the multiplexing circuit on a recording medium, wherein the reproducing portion comprising:

reproduction means for reproducing the signal recorded on the recording medium;

a demultiplexing circuit for separating a signal reproduced by the reproduction means into a reproduced video signal and/or a reproduced audio signal which have been scrambled and recorded on the recording medium, a reproduced first ID signal and a reproduced operation identification signal;

second identification code input means for inputting an identification code;

a second operation circuit for performing a predetermined operation designated by the reproduced operation identification signal on the identification code input by the second identification code input means and for outputting a second ID signal representing a result of the predetermined operation of the second operation circuit;

a comparator for comparing a value represented by the second ID signal with a value represented by the reproduced first ID signal and for outputting a signal representing a result of the comparison; and a descrambling circuit for performing a descrambling of the reproduced video signal and/or audio signal, which have been scrambled in the recording portion, according to the signal output by the comparator.

2. The recording and reproducing apparatus according to claim 1, wherein the identification code is m-bytes in length, wherein both of the first and second operation circuits generate a function of the identification code and then divides the generated function by a polynomial to obtain a quotient and a remainder and subsequently, the first operation circuit outputs a signal representing the remainder as the first ID signal, and the second operation circuit outputs a signal representing the remainder as the second ID signal.

3. The recording and reproducing apparatus according to claim 2, wherein sets of functions of the identification code, lengths of the identification code and polynomials are predetermined and wherein the operation identification signal designates one of the sets.

4. The recording and reproducing apparatus according to claim 2, wherein the function is the identification code to an nth power.

5. The recording and reproducing apparatus according to claim 4, whrein sets of functions of the identification code, lengths of the identification code and polynomials are predetermined and wherein the operation identification signal designates one of the sets.

6. The recording and reproducing apparatus according to claim 1, wherein the recording medium is a magnetic tape or a nonvolatile memory provided in a cassette, wherein when an erroneous identification code is input to the first or second identification code input means, a normal reproducing operation is interrupted by ejecting the cassette, or turning off a power.

7. A recording and reproducing apparatus comprising:

first identification code input means for inputting an identification code;

a scrambling circuit for generating a scrambling pattern according to the input identification code and for scrambling a video signal and/or an audio signal by using a signal representing the generated scrambling pattern;

an operation circuit for performing a predetermined operation on the input identification code and for outputting an ID signal representing a result of the operation;

operation designating means for outputting an operation identification signal designating the predetermined operation to the operation circuit;

a multiplexing circuit for performing a multiplexing on the scrambled video signal and/or the scrambled audio signal and the ID signal and the operation identification signal and for outputting a signal obtained as a result of the multiplexing; and recording means for recording the signal output from the multiplexing circuit on a recording medium.

8. The recording and reproducing apparatus according to claim 7, wherein the identification code is m-bytes in length, wherein the operation circuits generates a function of the identification code and then divides the generated function by a polynomial to obtain a quotient and a remainder and subsequently, the operation circuit outputs a signal representing the remainder as the ID signal.

9. The recording and reproducing apparatus according to claim 8, wherein the function is the identification code to an nth power.

10. The recording and reproducing apparatus according to claim 5, wherein sets of functions of the identification code, lengths of the identification code and polynomials are predetermined and wherein the operation identification signal designates one of the sets.

11. A recording and reproducing apparatus comprising:

reproduction means for reproducing signal recorded on a recording medium;

a demultiplexing circuit for separating a signal reproduced by the reproduction means into a reproduced video signal and/or a reproduced audio signal which have been scrambled and recorded on the recording medium, a reproduced first ID signal and a reproduced operation identification signal;

identification code input means for inputting an identification code;

an operation circuit for performing a predetermined operation designated by the reproduced operation identification signal on the identification code input by the identification code input means and for outputting a second ID signal representing a result of the operation;

a comparator for comparing a value represented by the second ID signal with a value represented by the reproduced first ID signal and for outputting a signal representing a result of the comparison; and a descrambling circuit for performing a descrambling of the reproduced video signal and/or audio signal, which have been scrambled and recorded on the recording medium, according to the signal output by the comparator.

12. The recording and reproducing apparatus according to claim 11, wherein the recording medium is a magnetic tape or a nonvolatile memory provided in a cassette, wherein when an erroneous identification code is input to the identification code input means, a normal reproducing operation is interrupted by ejecting the cassette, or turning off a power.

13. The recording and reproducing apparatus according to claim 11, wherein the identification code is m-bytes in length, wherein the operation circuits generates a function of the identification code and then divides the generated function by a polynomial to obtain a quotient and a remainder and subsequently, the operation circuit outputs a signal representing the remainder a the ID signal.

14. A recording and reproducing apparatus having a recording portion, a recording medium including a storage portion and a reproducing portion, the recording portion comprising:

first identification code input means for inputting an identification code;

a scrambling circuit for generating a scrambling pattern according to the input identification code and for scrambling a video signal and/or an audio signal by using a signal representing the generated scrambling pattern;

a first operation circuit for performing a predetermined operation on the input identification code and for outputting a first ID signal representing a result of the operation;

operation designating means for outputting an operation identification signal designating the predetermined operation to the operation circuit;

a multiplexing circuit for performing a multiplexing on the scrambled video signal and/or the scrambled audio signal and the first ID signal and for outputting a signal obtained as a result of the multiplexing; and recording means for recording the signal output from the multiplexing circuit on a recording medium, wherein the reproducing portion comprising:

reproduction means for reproducing the signal recorded on the recording medium;

a demultiplexing circuit for separating a signal reproduced by the reproduction means into a reproduced video signal and/or a reproduced audio signal which have been scrambled and recorded on the recording medium, and a reproduced first ID signal;

second identification code input means for inputting an identification code;

a second operation circuit for performing a predetermined operation designated by the operation identification signal on the identification code input by the second identification code input means and for outputting a second ID signal representing a result of the operation;

a comparator for comparing a value represented by the second ID signal with a value represented by the reproduced first ID signal and for outputting a signal representing a result of the comparison; and a descrambling circuit for performing a descrambling of the reproduced video signal and/or audio signal, which have been scrambled in the recording portion, according to the signal output by the comparator, wherein sets of functions of the identification code, lengths of the identification code and polynomials are predetermined and wherein the operation identification signal designates one of the sets and is stored in the storage portion.

15. The recording and reproducing apparatus according to claim 14, wherein the storage portion is detachably provided and is used in common by a plurality of recording and reproducing apparatuses.

16. A recording and reproducing apparatus having a recording medium including a storage portion, the recording and reproducing apparatus further comprising:

first identification code input means for inputting an identification code;

a scrambling circuit for generating a scrambling pattern according to the input identification code and for scrambling a video signal and/or an audio signal by using a signal representing the generated scrambling pattern;

an operation circuit for performing a predetermined operation on the input identification code and for outputting an ID signal representing a result of the operation;

operation designating means for outputting an operation identification signal designating the predetermined operation to the operation circuit;

a multiplexing circuit for performing a multiplexing on the scrambled video signal and/or the scrambled audio signal and the ID signal and for outputting a signal obtained as a result of the multiplexing; and recording means for recording the signal output from the multiplexing circuit on a recording medium, wherein sets of functions of the identification code, lengths of the identification code and polynomials are predetermined and wherein the operation identification signal designates one of the sets and is stored in the storage portion.

17. The recording and reproducing apparatus according to claim 16, wherein the storage portion is detachably provided and is used in common by a plurality of recording and reproducing apparatuses.

18. A recording and reproducing apparatus having a storage portion, the recording and reproducing apparatus further comprising:

reproduction means for reproducing signal recorded on a recording medium;

a demultiplexing circuit for separating a signal reproduced by the reproduction means into a reproduced video signal and/or a reproduced audio signal which have been scrambled and recorded on the recording medium, and a reproduced first ID signal;

identification code input means for inputting an identification code;

an operation circuit for performing a predetermined operation designated by an operation identification signal on the identification code input by the identification code input means and for outputting a second ID signal representing a result of the operation;

a comparator for comparing a value represented by the second ID signal with a value represented by the reproduced first ID signal and for outputting a signal representing a result of the comparison; and a descrambling circuit for performing a descrambling of the reproduced video signal and/or audio signal, which have been scrambled and recorded on the recording medium, according to the signal output by the comparator, wherein sets of functions of the identification code, lengths of the identification code and polynomials are predetermined and wherein the operation identification signal designates one of the sets and is stored in the storage portion.

19. The recording and reproducing apparatus according to claim 18, wherein the storage portion is detachably provided and is used in common by a plurality of recording and reproducing apparatuses.

* * * * *